(12) United States Patent
Vermeersch et al.

(10) Patent No.: US 9,937,790 B2
(45) Date of Patent: Apr. 10, 2018

(54) MOUNTING ASSEMBLY FOR VEHICLE SHIFT MECHANISM

(71) Applicant: STEERING SOLUTIONS IP HOLDING CORPORATION, Saginaw, MI (US)

(72) Inventors: Michael C. Vermeersch, Essexville, MI (US); Arthur W. Nellett, Davison, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 438 days.

(21) Appl. No.: 14/626,108

(22) Filed: Feb. 19, 2015

(65) Prior Publication Data

US 2016/0243938 A1 Aug. 25, 2016

(51) Int. Cl.
*F16H 59/00* (2006.01)
*B60K 20/06* (2006.01)

(52) U.S. Cl.
CPC ............. *B60K 20/06* (2013.01); *F16H 59/00* (2013.01)

(58) Field of Classification Search
CPC ................................ B60K 20/06; F16H 59/00
See application file for complete search history.

(56) References Cited

U.S. PATENT DOCUMENTS

| 3,596,531 | A | 8/1971 | Grosseau | |
|---|---|---|---|---|
| 4,132,123 | A | 1/1979 | Ishii | |
| 4,267,743 | A | 5/1981 | Tanaka | |
| 4,480,494 | A | 11/1984 | Gilmore | |
| 4,537,088 | A | 8/1985 | Kubota | |
| 4,762,015 | A | 8/1988 | Katayama | |
| 4,805,476 | A * | 2/1989 | Beauch | B60K 20/06 74/473.15 |
| 4,936,431 | A | 6/1990 | Shinpo | |
| 4,955,935 | A | 9/1990 | Katayama | |
| 5,022,504 | A * | 6/1991 | Kobayashi | B60K 20/06 192/220.2 |
| 5,492,031 | A | 2/1996 | Hedderly | |
| 7,125,027 | B2 | 10/2006 | Sap | |
| 7,278,526 | B2 * | 10/2007 | Vermeersch | F16H 61/22 192/220.2 |
| 7,469,616 | B2 * | 12/2008 | Fujiu | B62D 1/184 74/493 |

(Continued)

*Primary Examiner* — David M Fenstermacher
(74) *Attorney, Agent, or Firm* — Cantor Colburn LLP

(57) ABSTRACT

A mounting assembly for a vehicle shift mechanism is provided and includes a steering column having a stationary portion and a moveable portion. The mounting assembly also includes a column clamping structure of the stationary portion surrounding a portion of the moveable portion of the steering column. The mounting assembly further includes a shifter operatively coupled to the moveable portion of the steering column at a first coupling position located on a first side of the column clamping structure and at a second coupling position located on a second side of the column clamping structure. The mounting assembly yet further includes a stationary portion aperture defined by the stationary portion of the steering column, the stationary portion aperture extending from the second side of the column clamping structure in a longitudinal direction of the steering column, the second coupling position located within the stationary portion aperture.

10 Claims, 4 Drawing Sheets

(56) References Cited

U.S. PATENT DOCUMENTS

| | | | |
|---|---|---|---|
| 7,621,562 B2 | 11/2009 | Longo | |
| 7,690,685 B2 | 4/2010 | Sasaoka | |
| 8,342,574 B2 * | 1/2013 | Bahr | B62D 1/184 280/775 |
| 8,783,718 B1 * | 7/2014 | Clark | B60K 20/06 280/775 |
| 8,919,220 B2 * | 12/2014 | Moriyama | B62D 1/184 280/775 |
| 8,943,923 B2 * | 2/2015 | Kakishita | B62D 1/187 280/775 |
| 9,145,162 B2 * | 9/2015 | Butler | B62D 1/195 |
| 2001/0022111 A1 | 9/2001 | Ritchie | |
| 2001/0029802 A1 | 10/2001 | Bowerman | |
| 2003/0075913 A1 | 4/2003 | Li et al. | |
| 2003/0213673 A1 | 11/2003 | Burr | |
| 2005/0127656 A1 | 6/2005 | Sato | |
| 2005/0183534 A1 | 8/2005 | Maida | |
| 2005/0189756 A1 | 9/2005 | Ridgway | |
| 2006/0082122 A1 | 4/2006 | Uehle | |
| 2008/0150269 A1 | 6/2008 | Longo | |
| 2008/0238068 A1 | 10/2008 | Kumar | |
| 2008/0257097 A1 | 10/2008 | Graf | |
| 2009/0056493 A1 | 3/2009 | Dubay | |
| 2009/0241721 A1 | 10/2009 | Inoue | |
| 2010/0219624 A1 | 9/2010 | Matsuno | |
| 2010/0301593 A1 | 12/2010 | Sakata | |
| 2011/0185839 A1 | 8/2011 | Inoue | |
| 2012/0125139 A1 | 5/2012 | Tinnin | |
| 2012/0285286 A1 | 11/2012 | Schnitzer | |
| 2014/0000405 A1 | 1/2014 | Anspaugh | |
| 2015/0202960 A1 | 7/2015 | Vermeersch | |
| 2015/0202961 A1 | 7/2015 | Vermeersch | |
| 2015/0266497 A1 | 9/2015 | Yoshihara | |
| 2015/0360712 A1 | 12/2015 | Baumeister | |
| 2015/0375771 A1 | 12/2015 | Tinnin | |
| 2016/0010689 A1 | 1/2016 | Ishibashi | |
| 2016/0059880 A1 | 3/2016 | Bouvier | |
| 2016/0075367 A1 | 3/2016 | Sakuda | |

* cited by examiner

US 9,937,790 B2

MOUNTING ASSEMBLY FOR VEHICLE SHIFT MECHANISM

BACKGROUND OF THE INVENTION

The subject matter disclosed herein relates to steering column mounted transmission shifters and, more particularly, to a mounting assembly for a vehicle shift mechanism, as well as a method of mounting the shift mechanism in a decoupled manner.

Internally collapsing steering column designs that are cantilever in nature generally have low stiffness and poor natural frequency. If the application requires a column mounted shift system, the location of the shifter poses challenges.

If the shifter is mounted forward in the vehicle on a stationary structure portion of the steering column, the shift lever requires a severe off-set and/or the shift mechanism is cantilevered rearward (towards the driver) which creates a moment and high stress on the attachment. Conversely, mounting the shifter rearward in the vehicle on the upper-head telescoping portion of the steering column creates additional requirements for collapse of the steering column, NVH and anti-rotation reaction loads from the shift lever.

SUMMARY OF THE INVENTION

In accordance with an exemplary embodiment of the invention, a mounting assembly for a vehicle shift mechanism includes a steering column having a stationary portion and a moveable portion. Also included is a column clamping structure of the stationary portion surrounding a portion of the moveable portion of the steering column. Further included is a shifter operatively coupled to the moveable portion of the steering column at a first coupling position located on a first side of the column clamping structure and at a second coupling position located on a second side of the column clamping structure. Yet further included is a stationary portion aperture defined by the stationary portion of the steering column, the stationary portion aperture extending from the second side of the column clamping structure in a longitudinal direction of the steering column, the second coupling position located within the stationary portion aperture.

In accordance with another exemplary embodiment of the invention, a method of mounting a shifter to a vehicle steering column is provided. The method includes operatively coupling a shifter and an attachment bracket to a moveable portion of a steering column at a first coupling position located on a first side of a column clamping structure of a stationary portion of the steering column. The method also includes operatively coupling the shifter and the attachment bracket to the moveable portion of the steering column at a second coupling position located on a second side of the column clamping structure within a stationary portion aperture defined by the stationary portion.

In accordance with yet another exemplary embodiment of the invention, a steering column is provided. The steering column includes a stationary portion for telescoping adjustment with a moveable portion having a first portion extending within the stationary portion and a second portion extending therefrom. The steering column also includes a column clamping structure of the stationary portion surrounding a portion of the moveable portion and separating the first portion and the second portion of the moveable portion of the steering column. The steering column further includes a bridge bracket operatively coupled to the moveable portion at both the first portion and the second portion. The steering column yet further includes a vehicle shift mechanism coupled to the bridge bracket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a mounting assembly for mounting a vehicle shifter mechanism to a steering column is disclosed.

Figure 1:
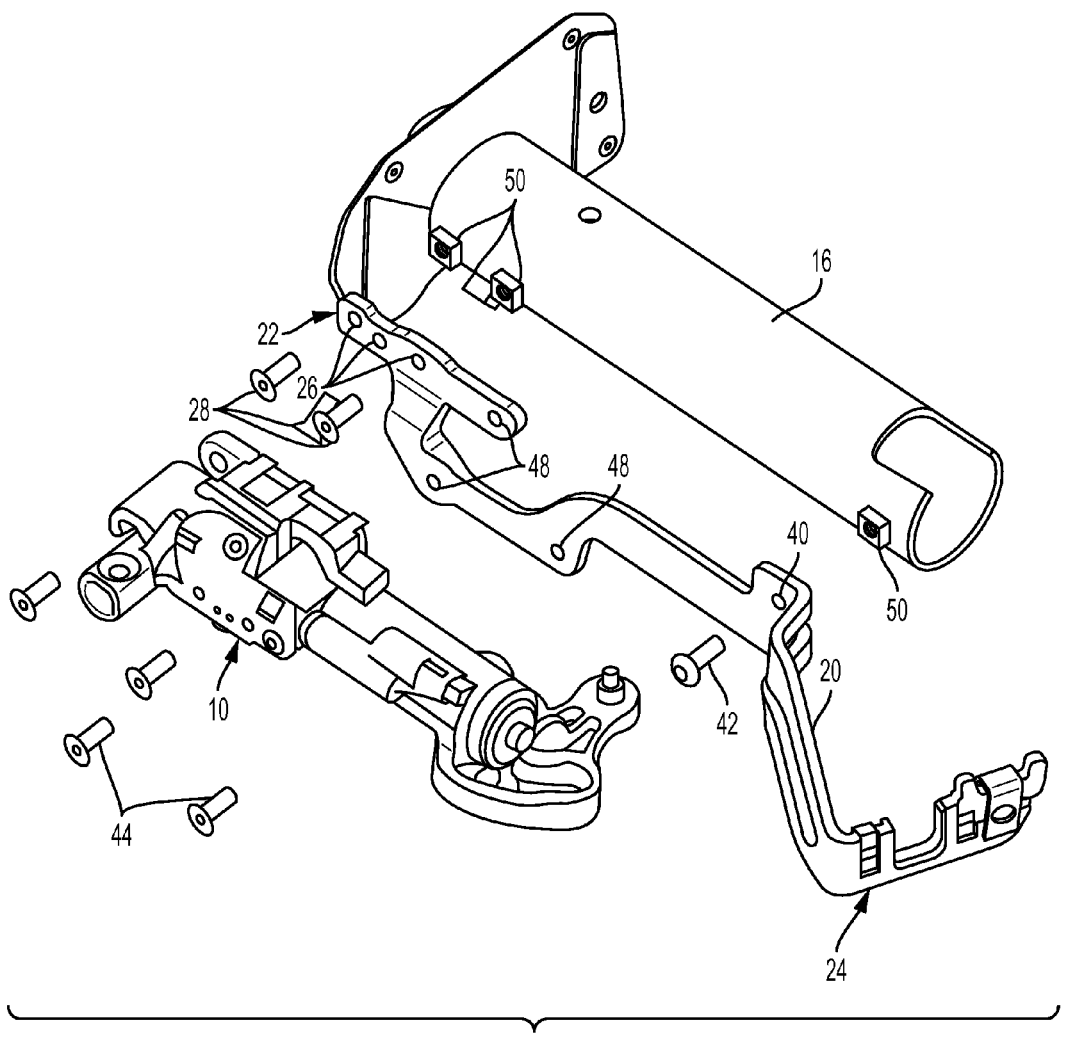
FIG. 1 is a perspective, disassembled view of a mounting assembly for mounting a vehicle shifter mechanism to a steering column.
Figure 2:
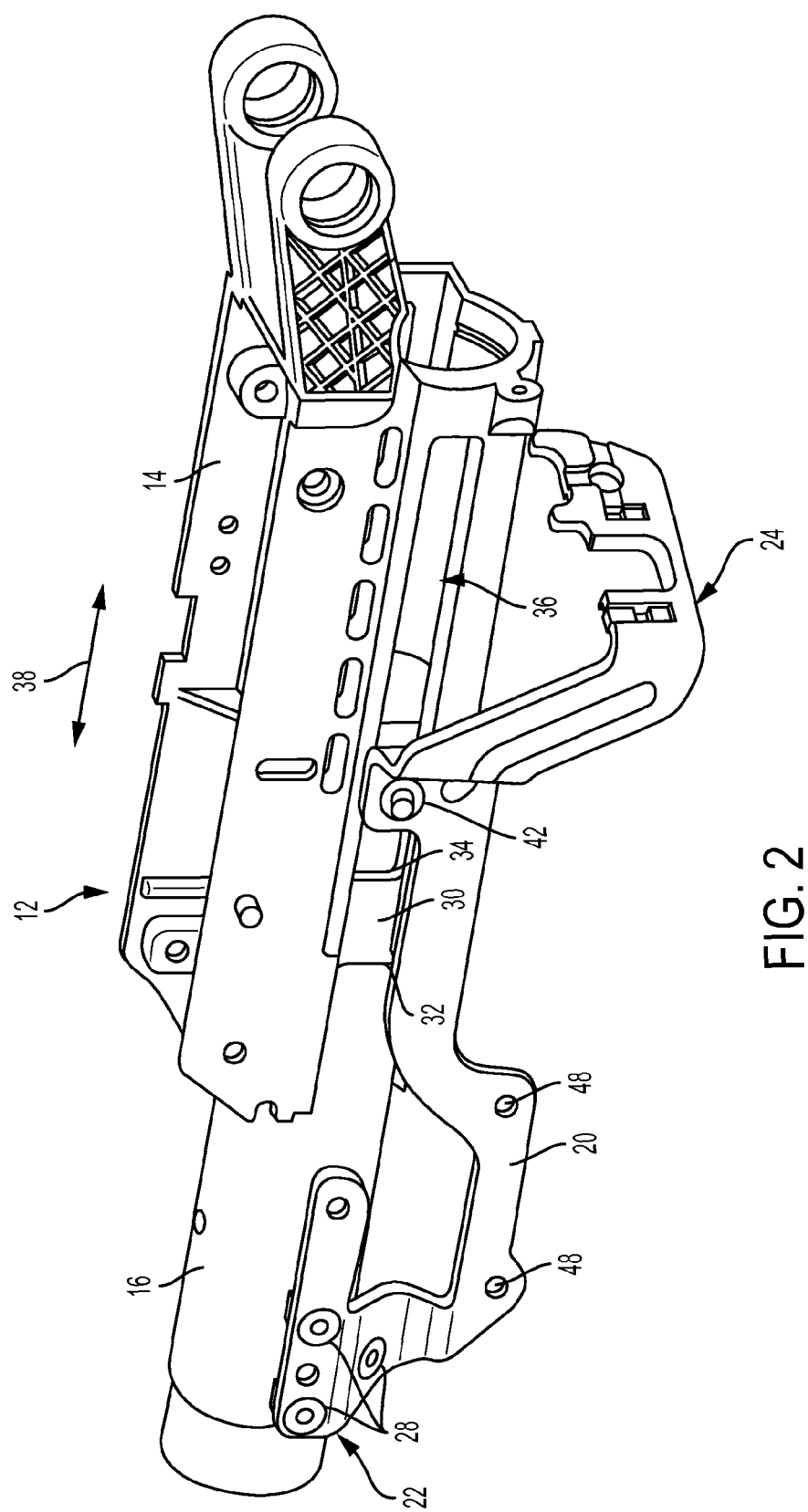
FIG. 2 is a perspective view of an attachment bracket of the mounting assembly coupled to the steering column.

Referring to FIGS. 1 and 2, a shifter mechanism is generally shown at 10. The shifter mechanism 10 is for a vehicle having a transmission. As shown, the shifter mechanism 10 is mounted to the vehicle at a steering column 12 and is connected to the transmission as is known in the art. The shifter mechanism 10 operates the transmission by changing drive gears of the transmission.

The steering column 12 includes a stationary portion 14 and a moveable portion 16. The moveable portion 16 is in telescoping engagement with the stationary portion 14. The telescoping relationship between the moveable portion 16 and the stationary portion 14 advantageously allows a user to adjust a steering wheel (not shown) of a vehicle in a translatable manner to a desirable position. Additionally, the telescoping relationship facilitates a collapsible function of the steering column 12 in the event of an energy absorption event, such as impact by the user with the steering wheel.

As will be appreciated from the description herein, the shifter mechanism 10 is operatively coupled to the moveable portion 16 of the steering column 12 at locations fore and aft of a clamping structure of the stationary portion 14 to stabilize reaction forces during telescoping movement of the steering column 12 to reduce the effect on NVH. Additionally, such a coupling avoids a cantilevered disposition of the shifter mechanism 10, thereby reducing excessive moments, while also accommodating the collapsibility requirements of the steering column 12.

An attachment bracket or bridge bracket 20 is provided to facilitate mounting of the shifter mechanism 10 to the steering column 12. More specifically, the shifter mechanism 10 is operatively coupled to the moveable portion 16 of the steering column 12 due to direct coupling of the attachment bracket 20 to the moveable portion 16. The attachment bracket 20 extends from a first end region 22 to a second end region 24. Proximate the first end region 22 is at least one aperture 26 defined by the attachment bracket 20. As shown, it is contemplated that a plurality of apertures 26 in the first end region 22 are included. The aperture(s) 26 is sized to receive a mechanical fastener 28 or the like therein for directly coupling the attachment bracket 20 to the moveable portion 16 of the steering column 12. Although described and illustrated as being coupled at the first end region 22, it is contemplated that coupling is made at a more intermediate position of the attachment bracket 20. Regardless of the precise position, this coupling is referred to herein as a first coupling position. A second coupling position will be described below.

The stationary portion 14 of the steering column 12 is configured to interact with the moveable portion 16 in a telescoping manner, as described above to account for adjustment of the steering column 12 by a user or to allow for collapse of the steering column in a safety event. To at least partially retain the moveable portion 16 relative to the stationary portion 14, the stationary portion includes a column clamping structure 30 that surrounds at least a portion of the moveable portion 16. The column clamping structure 30 includes a first side 32 and a second side 34.

The stationary portion 14 defines a stationary portion aperture 36 that extends from the second side 34 of the column clamping structure 30 in a longitudinal direction 38 of the stationary portion 14. The moveable portion 16 is configured to extend sufficiently into the stationary portion 14 in the longitudinal direction 38 to extend past the second side 34 of the column clamping structure 30 to be in a side-by-side arrangement with the stationary portion aperture 36.

The aforementioned second coupling position is located within the stationary portion aperture 36. In other words, the attachment bracket 20 is directly coupled to the moveable portion 16 of the steering column 12 at a location on the second side 34 of the column clamping structure 30. Similar to the first coupling position, the attachment bracket defines at least one aperture 40 configured to receive a mechanical fastener 42 therethrough for coupling to the moveable portion 16. The mechanical fastener 42 extends through the stationary portion aperture 36 and movement of the attachment bracket 20 is bounded by the walls that define the stationary portion aperture 36.

The coupling arrangement of the attachment bracket 20 and the steering column 12 facilitates translation of the attachment bracket 20 that corresponds to translation of the moveable portion 16 to which it is directly coupled. The coupled attachment bracket serves as an intermediate coupling member for the shifter mechanism 10. In particular, the shifter mechanism 10 is directly coupled to the attachment bracket 20 and indirectly coupled to the moveable portion 16 of the steering column 12 via mechanical fasteners 44 that extend through additional apertures 48 defined by the attachment bracket 20. This arrangement advantageously decouples the shifter mechanism 10 from the steering column 12 to isolate the shifter mechanism 10 from forces associated with the telescoping operation of the steering column 12. Additionally, as noted above, the operative coupling positions (i.e., first and second coupling positions) are on separate sides of the column clamping structure 30, thereby stabilizing the reaction forces associated with the telescoping operation of the steering column 12.

The coupling of the attachment bracket 20 to the moveable portion 16 of the steering column 12 will be described in greater detail. Specifically, while it is contemplated that the mechanical fasteners 28, 42 are inserted directly into the moveable portion 16, in some embodiments the moveable portion 16 includes coupling elements 50 that are disposed on an outer surface of the moveable portion 16. Any element, in combination with the mechanical fasteners 28, 42, configured to rigidly fix the attachment bracket 20 to the moveable portion 16 is contemplated. In one embodiment, the mechanical fasteners 28, 42 are threaded members and the coupling elements 50 are nuts that are welded to the moveable portion 16. Irrespective of the precise coupling elements and fasteners employed to couple the attachment bracket 20 to the moveable portion 16, it is to be appreciated that the attachment is suitable for repeated removal of the attachment bracket 20 for service or replacement. Similarly, the shifter mechanism 10 is attached to the attachment bracket 20 in a manner that facilitates repeated removal for service or replacement.

Figure 3:
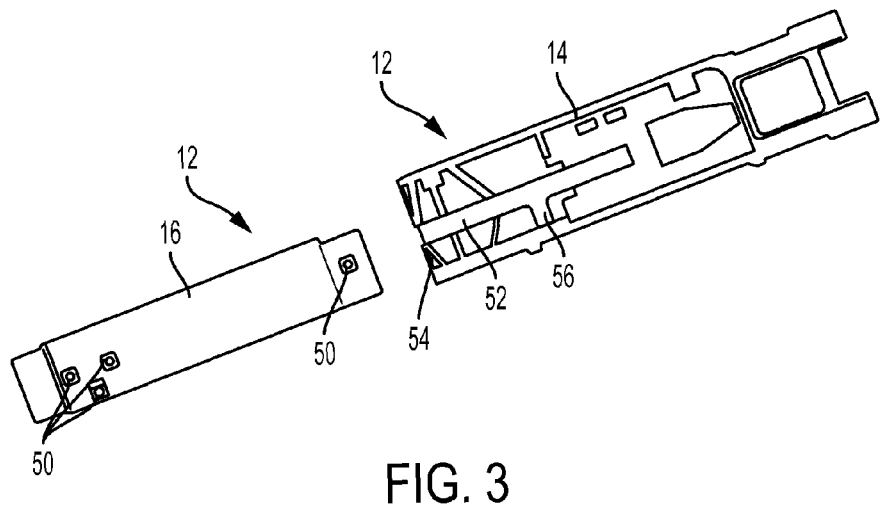
FIG. 3 is a perspective view of a moveable portion and a stationary portion of the steering column in a first assembly condition.
Figure 4:
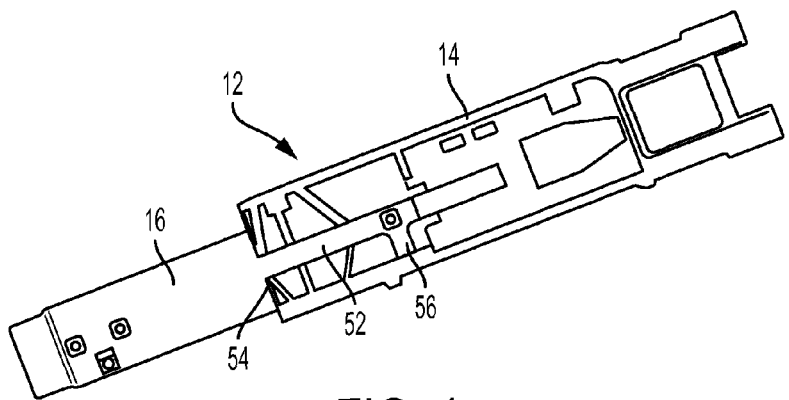
FIG. 4 is a perspective view of the moveable portion and the stationary portion in a second assembly condition.
Figure 5:
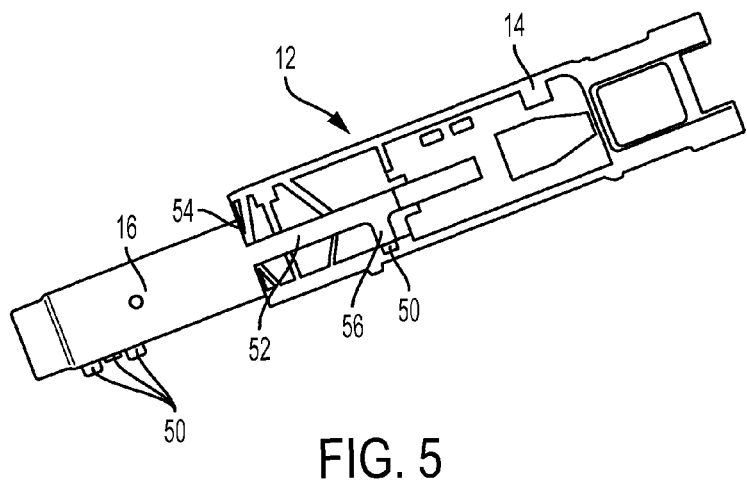
FIG. 5 is a perspective view of the moveable portion and the stationary portion in a third assembly condition.

Referring now to FIGS. 3-6, the moveable portion 16 and the stationary portion 14 are illustrated at various stages of assembly. As shown in FIGS. 3-5, the stationary portion 14 defines an axial slot 52 extending from a first end 54 of the stationary portion 14 in the longitudinal direction 38 of the stationary portion 14. A circumferential slot 56 is defined by the stationary portion 14 at an axial location of the axial slot 52 that is located on the second side 34 of the column clamping structure 30. The circumferential slot 56 extends between the axial slot 52 and the stationary portion aperture 36.

Figure 6:
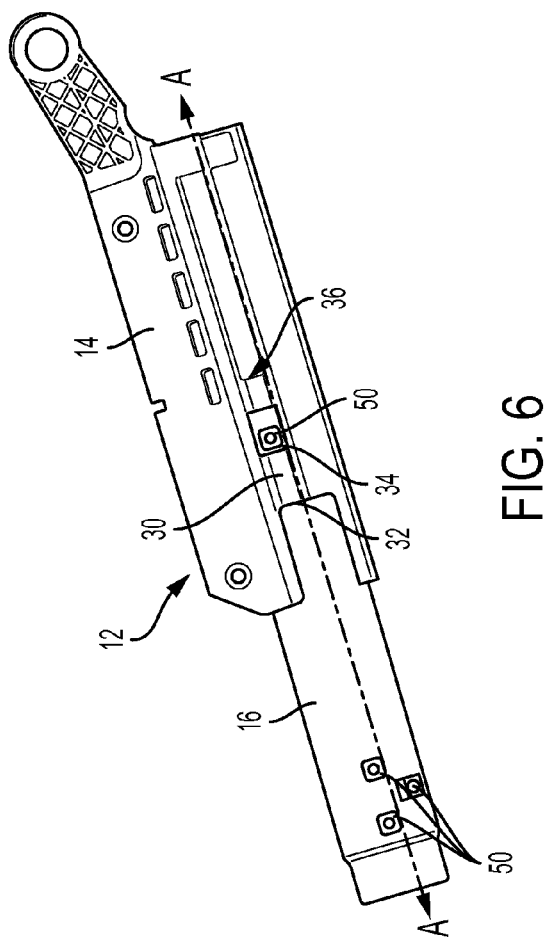
FIG. 6 is a perspective view of the moveable portion and the stationary portion in a fourth assembly condition.
Figure 7:
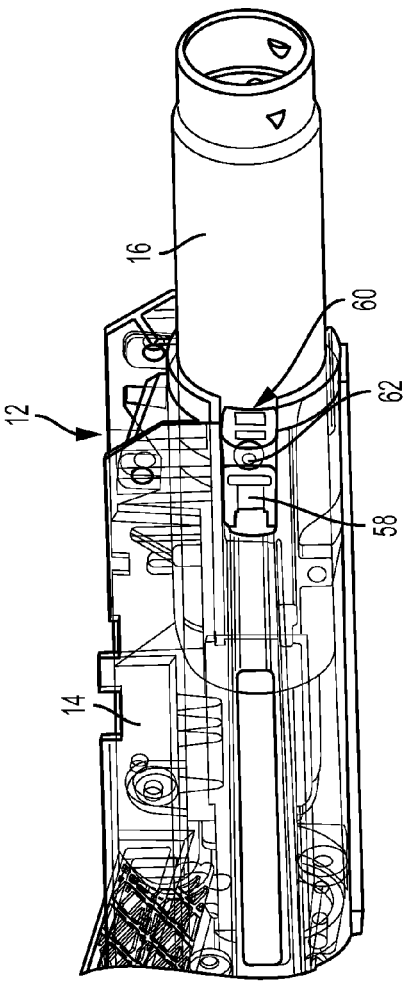
FIG. 7 is a perspective view of the moveable portion and the stationary portion in the fourth assembly condition of FIG. 6 according to another aspect of the invention.

The axial slot 52 and the circumferential slot 56 are dimensioned to allow the coupling element 50 secured to the moveable portion 16 to translate through each of the slots 52, 56. Initially, an assembly operator aligns the coupling element 50 with the axial slot 52 prior to insertion of the moveable portion 16 into the stationary portion 14 (FIG. 3). As the moveable portion 16 is translated into telescoping engagement with the stationary portion 14, the coupling element 50 translates through and along the axial slot 52 (FIG. 4). The axial slot 52 guides the coupling element 50 toward the circumferential slot 56. Upon reaching the axial location of the circumferential slot 56, the moveable portion 16 and the stationary portion 14 are rotated relative to each other to translate the coupling element 50 through and along the circumferential slot 56 (FIG. 5). The axial position of the circumferential slot 56 is on the second side 34 of the column clamping structure 30. Upon sufficient rotation, the coupling element 50 is positioned within the stationary portion aperture 36 (FIG. 6). FIG. 7 illustrates an opposing side of the steering column in a stage of assembly that corresponds to the stage shown in FIG. 6. This view illustrates an anti-rotation locking device 58 that is mounted to the moveable portion 16 once the moveable portion 16 is rotated to the position shown in FIGS. 6 and 7. The anti-rotation locking device 58 is positioned within a radial locking slot 60 defined by the stationary portion 14. The anti-rotation locking device 58 may be mounted to the moveable portion 16 in any suitable manner, including insertion of a mechanical fastener 62 through the anti-rotation locking device 58 and into fixed engagement with the moveable portion 16.

As described above, the coupling element 50 is disposed and retained within the circumferential slot 56 during assembly. The coupling element 50, when assembled in the slot 56, provides redundant retention which will prevent the moveable portion 16 from separating from the stationary portion 14 if an excessive force is applied to the moveable portion 16 in the direction 38 along a longitudinal axis A (FIG. 6) of the steering column 12. The walled portion defining the circumferential slot retains the coupling element 50, and therefore the moveable portion 16, to the stationary portion 14.

Advantageously, each of the embodiments described above provides a decoupled relationship between the shifter mechanism 10 and the steering column 12. Additionally, the coupling interface between the attachment bracket 20 and the steering column 12 is located on both sides (i.e., fore and aft) of the column clamping structure 30 to enhance the stiffness of the system, while also accommodating the telescoping requirements of the steering column 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A mounting assembly for a vehicle shift mechanism comprising:
    a steering column having a stationary portion and a moveable portion;
    a column clamping structure of the stationary portion surrounding a portion of the moveable portion of the steering column;
    a shifter operatively coupled to the moveable portion of the steering column at a first coupling position located on a first side of the column clamping structure and at a second coupling position located on a second side of the column clamping structure; and
    a stationary portion aperture defined by the stationary portion of the steering column, the stationary portion aperture extending from the second side of the column clamping structure in a longitudinal direction of the steering column, the second coupling position located within the stationary portion aperture.

2. The mounting assembly of claim 1, further comprising an attachment bracket disposed between, and directly coupled to, the shifter and the steering column, the attachment bracket coupled to the moveable portion of the steering column at the first coupling position and the second coupling position.

3. The mounting assembly of claim 2, wherein the shifter is coupled to the attachment bracket with at least one mechanical fastener and the attachment bracket is coupled to the moveable portion of the steering column with a plurality of mechanical fasteners.

4. The mounting assembly of claim 2, wherein the attachment bracket is coupled to the moveable portion of the steering column in a repeatedly removable manner.

5. The mounting assembly of claim 2, wherein the shifter is coupled to the attachment bracket in a repeatedly removable manner.

6. The mounting assembly of claim 1, further comprising a coupling element disposed on the moveable portion of the steering column and slidably disposed within the stationary portion aperture.

7. The mounting assembly of claim 6, wherein the coupling element comprises a nut welded to the moveable portion.

8. The mounting assembly of claim 6, further comprising:
    an axial slot defined by the stationary portion of the steering column and extending from a first end of the stationary portion, the axial slot dimensioned to translate the coupling element therethrough and to an axial position on the second side of the column clamping structure; and
    a circumferential slot defined by the stationary portion of the steering column, the circumferential slot located at an end of the axial slot and dimensioned to rotate the coupling element into the stationary portion aperture.

9. A steering column comprising:
    a stationary portion for telescoping adjustment with a moveable portion having a first portion extending within the stationary portion and a second portion extending therefrom;
    a column clamping structure of the stationary portion surrounding a portion of the moveable portion and separating the first portion and the second portion of the moveable portion of the steering column;
    a bridge bracket disposed between, and directly coupled to, the moveable portion at both the first portion and the second portion; and
    a vehicle shift mechanism directly coupled to the bridge bracket.

10. The steering column of claim 9, wherein the bridge bracket is coupled to the first portion with at least one mechanical fastener and the bridge bracket is coupled to the second portion with at least one mechanical fastener extending through the column clamping structure.

* * * * *